(12) United States Patent
Aravamudhan et al.

(10) Patent No.: US 10,237,418 B2
(45) Date of Patent: Mar. 19, 2019

(54) METHODS, SYSTEMS, AND COMPUTER READABLE MEDIA FOR CHARGING BASED ON RADIO CONGESTION IN MOBILE NETWORKS

(71) Applicant: Oracle International Corporation, Redwood Shores, CA (US)

(72) Inventors: Venkatesh Aravamudhan, Bangalore (IN); Nitin Gupta, Bangalore (IN); Shashikiran Bhalachandra Mahalank, Bangalore (IN); Raghuvamshi vasudev Singh Thakur, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 15/494,317

(22) Filed: Apr. 21, 2017

(65) Prior Publication Data
US 2018/0309880 A1 Oct. 25, 2018

(51) Int. Cl.
*H04M 15/00* (2006.01)
*H04W 4/24* (2018.01)
*H04W 28/02* (2009.01)

(52) U.S. Cl.
CPC ....... *H04M 15/8027* (2013.01); *H04M 15/41* (2013.01); *H04W 4/24* (2013.01); *H04W 28/0289* (2013.01)

(58) Field of Classification Search
CPC ... H04W 40/00; H04W 4/24; H04W 28/0289; H04W 28/12

USPC ...... 455/406, 456, 41.2, 509, 445, 444, 424, 455/436, 439
See application file for complete search history.

(56) References Cited

U.S. PATENT DOCUMENTS

| | | | |
|---|---|---|---|
| 6,795,701 B1 | 9/2004 | Baker et al. | |
| 6,871,070 B2 | 3/2005 | Ejzak | |
| 7,079,524 B2 | 7/2006 | Bantukul et al. | |
| 7,298,725 B2 | 11/2007 | Rune | |

(Continued)

FOREIGN PATENT DOCUMENTS

| | | | |
|---|---|---|---|
| CN | 101841766 A | 9/2010 | |
| CN | 102215469 A | 10/2011 | |

(Continued)

OTHER PUBLICATIONS

Applicant-Initiated Interview Summary for U.S. Appl. No. 14/794,369 (dated Mar. 15, 2018).

(Continued)

*Primary Examiner* — Joseph Arevalo
(74) *Attorney, Agent, or Firm* — Jenkins, Wilson, Taylor & Hunt, P.A.

(57) ABSTRACT

Methods, systems, and computer readable media for charging based on radio congestion in mobile networks are disclosed. In some examples, a method includes receiving a radio congestion message specifying a user plane congestion level for a radio access network (RAN) from a RAN congestion awareness function (RCAF) for the RAN. The method includes providing the user plane congestion level to a charging system. The method includes, at the charging system, altering one or more charging records for one or more respective subscribers accessing the RAN with user equipment (UE) based on the user plane congestion level.

17 Claims, 8 Drawing Sheets

(56) References Cited

U.S. PATENT DOCUMENTS

| | | | |
|---|---|---|---|
| 7,940,904 | B2 | 5/2011 | Cai et al. |
| 8,023,926 | B2 | 9/2011 | Cai et al. |
| 8,543,118 | B1 | 9/2013 | Mangal et al. |
| 8,787,174 | B2 | 7/2014 | Riley et al. |
| 9,179,008 | B2 | 11/2015 | Goldner et al. |
| 9,209,982 | B2 | 12/2015 | Menditto |
| 9,231,774 | B2 | 1/2016 | Cai et al. |
| 9,369,910 | B2 | 6/2016 | Rajagopalan et al. |
| 10,117,127 | B2 | 10/2018 | Baniel et al. |
| 2003/0003928 | A1 | 1/2003 | Marjelund et al. |
| 2005/0107091 | A1 | 5/2005 | Vannithamby et al. |
| 2005/0122945 | A1 | 6/2005 | Hurtta |
| 2007/0195788 | A1 | 8/2007 | Vasamsetti et al. |
| 2007/0232301 | A1 | 10/2007 | Kueh |
| 2008/0165687 | A1 | 7/2008 | Wang |
| 2009/0109845 | A1 | 4/2009 | Andreasen et al. |
| 2009/0270099 | A1 | 10/2009 | Gallagher et al. |
| 2010/0048161 | A1 | 2/2010 | He et al. |
| 2010/0091671 | A1 | 4/2010 | Lidstrom et al. |
| 2010/0121960 | A1 | 5/2010 | Baniel et al. |
| 2011/0035495 | A1 | 2/2011 | Ekström et al. |
| 2011/0067085 | A1 | 3/2011 | Brouard et al. |
| 2011/0122886 | A1 | 5/2011 | Willars et al. |
| 2011/0138066 | A1 | 6/2011 | Kopplin et al. |
| 2011/0158090 | A1 | 6/2011 | Riley et al. |
| 2011/0199903 | A1 | 8/2011 | Cuervo |
| 2012/0014332 | A1 | 1/2012 | Smith et al. |
| 2012/0131165 | A1 | 5/2012 | Baniel et al. |
| 2012/0155298 | A1 | 6/2012 | Yang et al. |
| 2012/0213072 | A1 | 8/2012 | Kotecha et al. |
| 2012/0250573 | A1 | 10/2012 | Kulasingam et al. |
| 2012/0250613 | A1 | 10/2012 | Robinson et al. |
| 2012/0290452 | A1 | 11/2012 | Pancorbo Marcos et al. |
| 2013/0070594 | A1 | 3/2013 | Garcia Martin et al. |
| 2013/0079006 | A1 | 3/2013 | Cho et al. |
| 2013/0114404 | A1 | 5/2013 | Yang |
| 2013/0160058 | A1 | 6/2013 | Albal et al. |
| 2013/0163424 | A1 | 6/2013 | Goerke et al. |
| 2013/0177146 | A1 | 7/2013 | Schneider et al. |
| 2013/0262308 | A1 | 10/2013 | Cai et al. |
| 2013/0265911 | A1 | 10/2013 | Kulaingam et al. |
| 2014/0011512 | A1 | 1/2014 | Hu et al. |
| 2014/0018067 | A1 | 1/2014 | Rajagopalan et al. |
| 2014/0022897 | A1 | 1/2014 | Rajagopalan et al. |
| 2014/0040975 | A1 | 2/2014 | Raleigh et al. |
| 2015/0011182 | A1* | 1/2015 | Goldner ............... H04M 15/66 455/406 |
| 2015/0195150 | A1 | 7/2015 | Ritter et al. |
| 2016/0014635 | A1 | 1/2016 | Rasanen |
| 2016/0050585 | A1 | 2/2016 | Shan |
| 2016/0073282 | A1 | 3/2016 | Speicher et al. |
| 2016/0100326 | A1* | 4/2016 | Chandramouli ........ H04W 8/26 370/241.1 |
| 2016/0269929 | A1* | 9/2016 | Livanos ............ H04W 28/0289 |
| 2017/0013502 | A1* | 1/2017 | Baniel ............... H04W 28/0289 |
| 2018/0146503 | A1* | 5/2018 | Castro Castro ....... H04W 76/18 |

FOREIGN PATENT DOCUMENTS

| | | |
|---|---|---|
| CN | 102223663 A | 10/2011 |
| CN | ZL201080064945.X | 11/2015 |
| EP | 0 936 825 A3 | 8/1999 |
| EP | 0 944 276 A1 | 9/1999 |
| EP | 0 857 399 B1 | 5/2004 |
| EP | 1 988 680 A1 | 11/2008 |
| EP | 2 093 931 A1 | 8/2009 |
| EP | 2 477 427 B1 | 3/2013 |
| EP | 2 819 455 A1 | 12/2014 |
| EP | 2 520 045 B1 | 7/2015 |
| JP | 03-270398 | 2/1991 |
| JP | 10-023509 | 1/1998 |
| JP | 2000-125341 A | 4/2000 |
| JP | 2001-054164 A | 2/2001 |
| JP | 2010-525732 A | 7/2010 |
| JP | 2011-501886 A | 1/2011 |
| JP | 2013540380 A | 10/2013 |
| KR | 10-2004-0107271 A | 12/2004 |
| WO | WO 1995/012292 A1 | 5/1995 |
| WO | WO 1999/057926 | 11/1999 |
| WO | WO 2004/006534 A1 | 1/2004 |
| WO | WO 2007/045991 A1 | 4/2007 |
| WO | WO 2009/058067 A1 | 5/2009 |
| WO | WO 2009/149341 A2 | 12/2009 |
| WO | WO 2011/082035 A2 | 7/2011 |
| WO | WO 2012/083795 A1 | 6/2012 |
| WO | WO 2014/014829 A1 | 1/2014 |
| WO | WO 2014/185987 A1 | 11/2014 |
| WO | WO 2014/014829 | 1/2018 |

OTHER PUBLICATIONS

Notice of Grant for Chinese Patent Application Serial No. ZL201380037292.X (dated Feb. 13, 2018).

Pre-Appeal Re-Examination Report for Japanese Patent Application Serial No. JP2015-521880 (dated Jan. 16, 2018).

Detailed Explanation on Procedure for Official Notice and Pre-appeal Re-Examination Report for Japanese Patent Application Serial No. JP2015-521880 (dated Jan. 23, 2018).

Non-Final Office Action for U.S. Appl. No. 14/794,369 (dated Dec. 29, 2017).

Decision to grant a European patent pursuant to Article 97(1) EPC for European Patent Application Serial No. EP13820508.3 (dated Dec. 21, 2017).

Advisory Action, Examiner-Initiated Interview Summary and AFCP 2.0 Decision for US. Appl. No. 14/794,369, (dated Sep. 29, 2017).

Letter Regarding Japanese Office Action for Japanese Patent Application No. 2015-521880 (dated Sep. 12, 2017)

Communication under Rule 71(3) EPC for European Application No. 13 820 508.3 (dated Aug. 24, 2017).

Notification of the First Office Action for Chinese Application No. 201380037292.X (dated Aug. 18, 2017).

Final Office Action for U.S. Appl. No. 14/794,369 (dated Jul. 11, 2017).

3 GPP, "LTE; General Packet Radio Service (GPRS) enhancements for Evolved Universal Terrestrial Radio Access Network (E-UTRAN) access (3GPP TS 23.401 V 14.3.0 Release 14)," ETSI TS 123 401 V14.3.0, pp. 1-392 (May 2017).

Letter Regarding Office Action for Japanese Patent Application No. 2015-521880 (dated Mar. 21, 2017).

Communication pursuant to Article 94(3) EPC for European Patent Application No. 13 820 508.3 (dated Feb. 9, 2017).

Non-Final Office Action for U.S. Appl. No. 14/794,369 (dated Dec. 30, 2016).

Communication pursuant to Article 94(3) EPC for European Patent Application No. 13 820 508.3 (dated Nov. 9, 2016).

Notice of Allowance and Fee(s) Due for U.S. Appl. No. 13/942,323 (dated Feb. 5, 2016).

Extended European Search Report for European Application No. 13820508.3 (dated Feb. 3, 2016).

Advisory Action & AFCP 2.0 Decision for U.S. Appl. No. 13/942,323 (dated Oct. 5, 2015).

Letter regarding Decision to Grant for Chinese Patent Application No. ZL201080064945.X (dated Sep. 1, 2015).

Final Office Action for U.S. Appl. No. 13/942,323 (dated Jun. 9, 2015).

"Policy Control & Charging System," http://www.yemenmobile.com.ye/userimages/2015/06.pdf, pp. 1-26 (Jun. 2015)).

Communication under Rule 71(3) EPC for European Patent Application No. 10841576.1 (dated May 7, 2015).

Communication of European Publication Number and Information on the Application of Article 67(3) EPC for European Patent Application No. 13820508.3 (dated Apr. 22, 2015).

Notification of the Second Office Action for Chinese Patent Application No. 201080064945.X (dated Apr. 22, 2015).

Non-Final Office Action for U.S. Appl. No. 13/942,323 (dated Feb. 25, 2015).

(56) References Cited

OTHER PUBLICATIONS

3GPP, "3rd Generation Partnership Project; Technical Specification Group Core Network and Terminals; Nq and Nq' Application Protocol (Nq-AP); Stage 3 (Release 13)," 3GPP TS 29.405 V0.3.0, pp. 1-19 (Feb. 2015).
3GPP, "3rd Generation Partnership Project; Technical Specification Group Services and System Aspects; Telecommunication management; Charging management; Packet Switched (PS) domain charging (Release 12)," 3GPP TS 32.251 V12.9.0, pp. 1-159 (Mar. 2015).
3GPP, "3rd Generation Partnership Project; Technical Specification Group Core Network and Terminals; Policy and Charging Control over Np reference point (Release 13)," 3GPP TS 29.217 V1.0.0, pp. 1-20 (Nov. 2014).
3GPP, "3rd Generation Partnership Project; Technical Specification Group Services and System Aspects; Study on system enhancements for user plane congestion management (Release 13)," 3GPP TR 23.705 V1.2.0 (Nov. 2014).
First Office Action for Chinese Application No. 201080064945.X (dated Sep. 17, 2014).
European Search Report for European Patent Application No. 10841576.1 (dated May 9, 2014).
Notice of Allowance and Fee(s) Due for U.S. Appl. No. 12/973,228 (dated Mar. 20, 2014).
Notification of Transmittal of the International Search Report and the Written Opinion of the International Searching Authority, or the Declaration for International Application No. PCT/US2013/050512 (dated Dec. 2, 2013).
Non-Final Office Action for U.S. Appl. No. 12/973,228 (dated Oct. 25, 2013).
Final Office Action for U.S. Appl. No. 12/973,228 (dated Jun. 21, 2013).
Non-Final Office Action for U.S. Appl. No. 12/973,228 (dated Feb. 1, 2013).
3 GPP, "3rd Generation Partnership Project; Technical Specification Group Services and System Aspects; Telecommunication management; Charging management; Diameter charging applications (Release 11)," 3GPP TS 32.299 V11.6.0, pp. 1-152 (Dec. 2012).
3GPP, "3rd Generation Partnership Project; Technical Specification Group Services and System Aspects; Policy and charging control architecture (Release 11)," 3GPP TS 23.203 V11.8.0, pp. 1-178 (Dec. 2012).
3GPP, "3rd Generation Partnership Project; Technical Specification Group Core Network and Terminals; Policy and Charging Control (PCC); Reference points (Release 11)," 3GPP TS 29.212 V11.7.0 pp. 1-196 (Dec. 2012).
Communication of European Publication Numbers and Information on the Application of Article 67(3) EPC for European Patent Application No. 10841576.1 (dated Oct. 10, 2012).
3GPP, "3rd Generation Partnership Project; Technical Specification Group Core Network and Terminals; Policy and Charging Control: Spending Limit Reporting over Sy reference point (Release 11)," 3GPP TS 29.219 V11.2.0 pp. 1-20 (Sep. 2012).
Notification of Transmittal of the International Search Report and the Written Opinion of the International Searching Authority, or the Declaration for International Patent Application No. PCT/US2010/061586 (dated Sep. 26, 2011).
Tekelec et al., "Discussion paper on Usage-reporting from PCRF to OCS over Sy," 3GPP TSG SA WG2 #86, pp. 1-2 (Jul. 11-15, 2011).
3GPP, "3rd Generation Partnership Project; Technical Specification Group GSM/EDGE Radio Access Network; Mobile Radio Interface Layer 3 Specification; Radio Resource Control (RRC) Protocol (Release 10)," 3GPP TS 44.018 V10.0.0, pp. 1-429 (Sep. 2010).
3GPP, "3rd Generation Partnership Project; Technical Specification Group Radio Access Network; Evolved Universal Terrestrial Radio Access (E-UTRA); Radio Resource Control (RRC); Protocol Specification (Release 9)," 3GPP TS 36.331 V9.4.0, pp. 1-252 (Sep. 2010).
3GPP, "3rd Generation Partnership Project; Technical Specification Group Radio Access Network; Radio Resource Control (RRC); Protocol Specification (Release 9)," 3GPP TS 25.331, V9.4.0, pp. 1-1789 (Sep. 2010).
3GPP, "3rd Generation Partnership Project; Technical Specification Group Services and System Aspects; Telecommunication management; Charging management; Charging architecture and principles (Release 8)," 3GPP TS 32.240 V8.6.0, 1-44 (Jun. 2010).
3GPP, "3rd Generation Partnership Project; Technical Specification Group Core Network and Terminals; UICC-terminal Interface; Physical and Logical Characteristics (Release 9)," 3GPP TS 31.101, V9.1.0, pp. 1-35 (Jun. 2010).
3GPP, "3rd Generation Partnership Project; Technical Specification Group Core Network and Terminals; Non-Access-Stratum (NAS) Functions Related to Mobile Station (MS) in Idle Mode (Release 10)," 3GPP TS 23.122 v10.0.0, pp. 1-41 (Jun. 2010).
3GPP, "Universal Mobile Telecommunications System (UMTS); LTE; 3GPP Evolved Packet System (EPS); Evolved General Packet Radio Service (GPRS) Tunnelling Protocol for Control Plane (GTPv2-C); Stage 3 (3GPP TS 29.274 version 9.3.0 Release 9)," ETSI TS 129 274 V9.3.0, pp. 1-162 (Jun. 2010).
"Universal Mobile Telecommunications System (UMTS); LTE; Policy and Charging Control over Gx Reference Point (3GPP TS 29.212 version 9.2.0 Release 9)," ETSI TS 129 212 V9.2.0, pp. 1-115 (Apr. 2010).
3GPP, "3rd Generation Partnership Project; Technical Specification Group Service and System Aspects; Telecommunication management; Charging management; Charging Data Record (CDR) parameter description (Release 9)," 3GPP TS 32.298 V9.2.0, pp. 1-135 (Dec. 2009).
3GPP, "3rd Generation Partnership Project; Technical Specification Group Services and System Aspects; Network Identity and Timezone (NITZ); Service Description, Stage 1 (Release 9)," 3GPP TS 22.042, V9.0.0, pp. 1-8 (Dec. 2009).
Balbás et al., "Policy and Charging Control in the Evolved Packet System," LTE—3GPP Release 8, IEEE Communications Magazine, pp. 68-74 (Feb. 2009).
3GPP, "Digital Cellular Telecommunications System (Phase 2+); Universal Mobile Telecommunications System (UMTS); Universal Subscriber Identity Module (USIM) Application Toolkit (USAT) (3GPP TS 31.111 version 8.3.0 Release 8)," ETSI TS 131 111 V8.3.0, pp. 1-102 (Oct. 2008).
"IP Multimedia Subsystem," printout from wikipedia.org, Wikimedia Foundation, Inc. (May 29, 2007).
Hakala et al., "Diameter Credit-Control Application," Network Working Group, RFC 4006, pp. 1-114 (Oct. 2005).
"Diameter Overview," referenced from www.ulticom.com/html/products/signalware-diameter-reference-guide.asp (Publication date unknown).
Notice of Allowance and Fee(s) Due and Examiner-Initiated Interview Summary for U.S. Appl. No. 14/794,369 (dated Jun. 28, 2018).
First Examination Report for Indian Patent Application Serial No. 6545/CHENP/2012 (September 28, 2018).
Office Action for Japanese Patent Application Serial No. 2015-521880 (Nov. 27, 2018).

* cited by examiner

METHODS, SYSTEMS, AND COMPUTER READABLE MEDIA FOR CHARGING BASED ON RADIO CONGESTION IN MOBILE NETWORKS

TECHNICAL FIELD

The subject matter described herein relates generally to radio congestion in mobile networks. More particularly, the subject matter described herein relates to methods, systems, and computer readable media for charging based on radio congestion in mobile networks.

BACKGROUND

Wireless or mobile network operators can struggle to cope with the data deluge in their networks and to make sure that the wireless spectrum is prioritized to suit their business objectives. The mobile network operator is being pressured both from the increased amount of access (e.g., the rate of growth of smartphone adoption) and the increased amount of data flow (e.g., the rate of growth in data use in the network) in the mobile network.

In some networks, congestion can occur at the radio access network (RAN) used to access a core network. For example, popular events such as music concerts and sporting events can draw large crowds of people into the same physical area. The large numbers of users attempting to use the RAN can cause congestion at the RAN. Users may experience congestion in the form of slow data rates and inability to connect.

The $3^{rd}$ Generation Partnership Project (3GPP) Technical Specification (TS) 29.217 v1.0.0, the disclosure of which is incorporated herein by reference in its entirety, describes and defines the Np interface. The Np interface lies between the RAN congestion awareness function (RCAF) and the policy and charging rules function (PCRF). The technical specification describes a procedure to enable the RCAF to report to the PCRF the congestion state of an evolved nodeB (eNodeB) or group of cells (e.g., a known service area) or a cell for a specific user.

3GPP TS 29.405 v0.3.0 defines and describes the Nq and Nq' interfaces. The Nq interface lies between the RCAF and the mobility management entity (MME). The Nq' interface lies between the RCAF and the serving GPRS support node (SGSN). The technical specification describes a procedure to enable the RCAF to retrieve a list of users and access point names (APNs) for a given congested eNodeB or cell. The PCRF can use the congestion information from the RCAF for policy decisions such as controlling quality of service (QoS) and flow control; however, the congestion information is generally not otherwise used in the core network.

Accordingly, in light of these difficulties, there exists a need for methods, systems, and computer readable media for using congestion information, e.g., for charging based on congestion information.

SUMMARY

The subject matter described herein relates to methods, systems, and computer readable media for altering charging based on radio congestion in mobile networks. In some examples, a method includes receiving, by one or more computer systems implementing a core network function of a telecommunications network, a radio congestion message specifying a user plane congestion level for a radio access network (RAN) from a RAN congestion awareness function (RCAF) for the RAN. The method includes providing, by the one or more computer systems, the user plane congestion level to a charging system of the telecommunications network. The method includes altering, by the charging system, one or more charging records for one or more respective subscribers accessing the RAN with user equipment (UE) based on the user plane congestion level.

In some examples, the one or more computer systems include a policy and charging rules function (PCRF) system for the telecommunications network, and the charging system is an online charging system (OCS). Providing the user plane congestion level to the charging system can include transmitting, on a Gx interface, the user plane congestion level to a PDN gateway (PGW) that, in response, transmits, on a Gy interface, the user plane congestion level to the OCS. Providing the user plane congestion level to the charging system can include transmitting, on an Sy interface, the user plane congestion level to the OCS. Providing the user plane congestion level to the charging system can include sending one or more interface-based messages or one or more session-based messages.

In some examples, altering the one or more charging records includes, for at least a first subscriber of the one or more subscribers, offering the first subscriber, using first user equipment (UE) of the first subscriber, a choice between at least an instant charging benefit during a session for the first subscriber and a later charging benefit to be implemented after the session.

In some examples, the one or more computer systems include a mobility management entity (MME) system, and the charging system is an offline charging system (OFCS). Providing the user plane congestion level to the charging system can include transmitting, on a S11 interface, the user plane congestion level to a signaling gateway (SGW) and, at the SGW, adding the user plane congestion level to one or more call detail records (CDRs) for the subscribers. Providing the user plane congestion level to the charging system can include transmitting, on a S5/S8 interface, the user plane congestion level to a PDN gateway (PGW) and, at the PGW, adding the user plane congestion level to one or more call detail records (CDRs) for the subscribers.

In some examples, providing the user plane congestion level to the charging system includes providing a duration of congestion for the user plane congestion level to the charging system, and altering the one or more charging records includes altering the one or more charging records based on the duration of congestion.

According another aspect of the subject matter describe herein, a system for altering charging based on radio congestion in mobile networks is provided. The system includes one or more computer systems implementing a core network function of a telecommunications network and a charging system of the telecommunications network. The one or more computer systems are configured for receiving a radio congestion message specifying a user plane congestion level for a radio access network (RAN) from a RAN congestion awareness function (RCAF) for the RAN and providing the user plane congestion level to the charging system. The charging system is configured for altering one or more charging records for one or more respective subscribers accessing the RAN with user equipment (UE) based on the user plane congestion level.

The methods, systems, and computer readable media for charging based on radio congestion can be useful, e.g., in improving the operation of telecommunications network computing equipment. For example, network operators can alleviate some types of RAN congestion by reducing the number of users on congested RANs. In another example, network operators can use the charging information for RAN analysis to improve connectivity in certain coverage areas. The methods, systems, and computer readable media for charging based on radio congestion can also be useful, e.g., to improve end customer satisfaction by improving the service experience by accounting for service impacts due to radio network congestion.

The subject matter described herein may be implemented in hardware, software, firmware, or any combination thereof. As such, the terms "function", "node" or "module" as used herein refer to hardware, software and/or firmware components for implementing the feature(s) being described. In some examples, the subject matter described herein may be implemented using a non-transitory computer readable medium having stored thereon computer executable instructions that when executed by the processor of a computer cause the computer to perform steps.

Computer readable media suitable for implementing the subject matter described herein include non-transitory computer-readable media, such as disk memory devices, chip memory devices, programmable logic devices, random access memory (RAM), read only memory (ROM), optical read/write memory, cache memory, magnetic read/write memory, flash memory, and application specific integrated circuits. In addition, a computer readable medium that implements the subject matter described herein may be located on a single device or computing platform or may be distributed across multiple devices or computing platforms.

DETAILED DESCRIPTION

Figure 1:
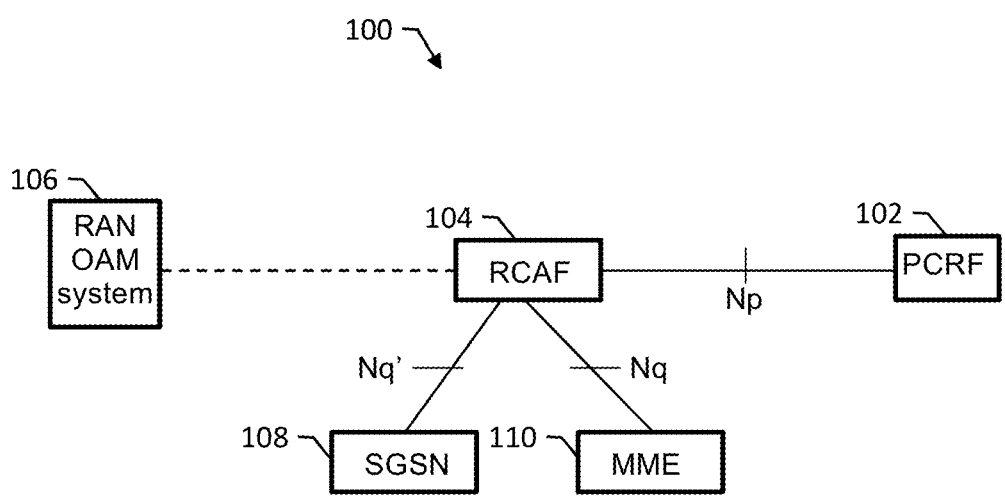
FIG. 1 is a block diagram of an example telecommunications network including a PCRF and an RCAF.

FIG. 1 is a block diagram of an example telecommunications network 100 including a PCRF 102 and an RCAF 104 communicating using an Np interface, e.g., as specified by 3GPP TS 29.217 v1.0.0 or any appropriate technical specification.

PCRF 102 may include on or more processors that perform the operations described herein for receiving a radio congestion message and providing a user plane congestion level to a charging system. For example, PCRF 102 may be implemented on a computing platform includes one or more processor blades, each implementing a PCRF or other function. PCRF 102 may be implemented in a distributed computing system or any appropriate system of one or more computers. PCRF 102 is part of a 3GPP policy charging control (PCC) architecture. The elements of the PCC provide access, resource, and quality-of-service (QoS) control.

In operation, PCRF 102 functions in real-time or near real-time to determine policy rules in the telecommunication network. PCRF 102 can operate at the network core and access user information and other specialized functions in a centralized manner. PCRF 102 can aggregate information to and from the telecommunications network, operational supports systems, and other sources in real time, which can be useful for the creation of rules and automatically making policy decisions for each user active on the telecommunications network. Using PCRF 102, the telecommunications network can offer multiple services, QoS levels, and charging rules.

In some examples, PCRF 102 provides the ability to manage network and user policy in real time. PCRF 102 can efficiently and dynamically route and prioritize network traffic. PCRF 102 can provide a unified view of user context based on one or more of device, network, location, and billing data. PCRF 102 can provide key inputs to revenue assurance and bandwidth management.

RCAF 104 reports RUCI via the Np interface to PCRF 102. PCRF 102 can use the RAN user plane congestion status when making policy decisions. In some examples, RUCI includes the following information:

The user identifier (e.g., international mobile subscriber identity (IMSI)) identifying the user equipment (UE) that is impacted by congestion;

The packet data network (PDN) identifier for which congestion information is reported;

Congestion level information (e.g., congestion level value or congestion level set id) of the UE impacted by congestion;

The eNodeB identifier, E-UTRAN cell global identifier (ECGI), or service area identifier (SAI) identifying the eNodeB, E-UTRAN cell, or Service Area, respectively, serving the UE.

RCAF 104 can maintain a context on user-specific basis. The context can be identified by the user identifier, e.g., the IMSI. The context can include the following information:

The previously reported congestion level over the Np reference point;

The reporting restrictions received from PCRF 102 on user-specific, per access point name (APN) basis. The reporting restrictions can be stored by RCAF 104 until PCRF 102 explicitly signals to remove the reporting restrictions.

At the protocol level, the Np interface can be implemented using a Diameter based application. Diameter is an authentication, authorization, and accounting protocol for computer networks. Diameter applications extend the base protocol by adding new commands and/or attributes, e.g., commands and attributes for use with the extensible authentication protocol (EAP). A typical Diameter packet includes a Diameter header and a variable number of attribute-value pairs (AVPs) for encapsulating information relevant to the Diameter message.

PCRF 102 can act as a Diameter server. PCRF 102 acts as a Diameter server because it is the network element that handles the RUCI reporting for a particular realm. RCAF 104 can act as the Diameter client. RCAF 104 acts as a Diameter client because it is the network element reporting the RUCI.

The Np protocol is a user-specific protocol. So notifications made by RCAF 104 or subscriptions to notifications made by PCRF 102 are done on a user-specific basis. In general, messages on the Np protocol are user-specific, i.e., the messages contain a user identifier or are otherwise associated with a particular user. This enables Np to have simplicity and adherence to the generic Diameter framework in a PCC.

RCAF 104 can use two types of RUCI reports on the Np interface for transfer of congestion information from RCAF 104 to PCRF 102: Non-aggregated RUCI reports and aggregated RUCI reports.

For a Non-aggregated RUCI report, RCAF 104 can send an NRR command to PCRF 102 by including the user id within the Subscription-Id AVP, PDN ID within the Called-Station-Id AVP, and a congestion level set id within the Congestion-Level-Set-Id AVP if the reporting restriction was provided earlier or a congestion level value within the Congestion-Level-Value AVP if the reporting restriction was not provided earlier at the command level. RCAF 104 can provide congestion location identifier of the UE within the Congestion-Location-Id AVP in the NRR command. RCAF 104 can also include the RCAF Identity within the RCAF-Id AVP in every NRR command for a specific user id and PDN ID.

Once PCRF 102 receives the NRR command, PCRF 102 stores the related information and responds with a Non-aggregated RUCI Report Answer (NRA) command including the PCRF ID within the PCRF-Address AVP. PCRF 102 can use the RUCI received from RCAF 104 as input for policy decisions. When RCAF 104 receives the NRA command, RCAF 104 can store the PCRF ID in the UE context for this specific user ID together with the PDN ID for further aggregated RUCI report.

If the ReportRestriction feature is both supported by RCAF 104 and PCRF 102, then PCRF 102 may specify or modify report restriction by including one or more Congestion-Level-Definition AVP(s) including the defined congestion level set within the Congestion-Level-Set-Id AVP and corresponding congestion level(s) within the Congestion-Level-Range AVP. PCRF 102 can remove the reporting restrictions by including the Reporting-Restriction AVP set to 0 if the reporting restrictions were provisioned earlier. PCRF 102 can stop RUCI reporting if previously enabled, e.g., by including the RUCI-Action AVP set to 0 (Disable RUCI Reporting), or enable the RUCI Reporting if previously disabled, by including the RUCI-Action AVP set to 1 (Enable RUCI Reporting) in the NRA command.

For an Aggregated RUCI report, RCAF 104 aggregates the RUCIs of different user IDs and PDN IDs that have PCRF 102 as a destination. RCAF 104 can send an Aggregated RUCI Report Request (ARR) command to PCRF 102 by including the PCRF ID within the Destination-Host AVP. RCAF 104 can include one or more Aggregated-RUCI-Report AVP with a congestion level set id within the Congestion-Level-Set-Id AVP if the reporting restriction was provided earlier or a congestion level value within the Congestion-Level-Value AVP if the reporting restriction was not provided earlier. RCAF 104 can include the PDN ID within the Called-Station-ID AVP and the user ID list in the Subscription-Id AVPs.

Once PCRF 102 receives the ARR command, PCRF 102 can store the related information and respond with an Aggregated RUCI Report Answer (ARA) command. PCRF 102 can use the RUCI received from RCAF 104 as input for policy decisions.

When a cell or a service area or an eNodeB is congested, the cell or the service area or the eNodeB is likely to be congested for all users who are served by the cell or the service area or the eNodeB. The cell or the service area or the eNodeB may be congested equally for all users who are served by the cell. In these cases, RCAF 104 can send an ARR command with user IDs for the affected users.

RCAF 104 can periodically check one or more eNodeBs or a service area or a cell to determine whether or not the eNodeBs or a service area or a cell are experiencing congestion. For example, RCAF 104 can poll the eNodeBs or a service area or a cell at regular time intervals or in response to certain events occurring within network 100. RCAF 104 can use any appropriate technique to check the eNodeBs, e.g., by polling the eNodeBs or subscribing to status feeds from the eNodeBs or by otherwise monitoring the eNodeBs.

In this specification, RCAF 104 will be described with respect to one or more eNodeBs for purposes of illustration. The references to the one or more eNodeBs can also apply to a group of eNodeBs, to a cell, or to a service area. Similarly, any reference to a cell or a service area can apply to a group of eNodeBs. Generally, RCAF 104 checks for congestion in a radio access network and reports congestion for some set of equipment in the radio access network, and the set of equipment can be one or more eNodeBs, which can comprise a cell or a service area.

RCAF 104 can determine that one or more eNodeBs are experiencing congestion, so that some or all connected users are likely experiencing congestion, using any appropriate metric for determining a level of congestion or a level of consumption of computing resources and data transmission resources. For example, RCAF 104 can determine that an eNodeB is congested, so that some or all connected users are experiencing congestion, when a number of users connected to the eNodeB is greater than a specified tolerable number of users for the eNodeB.

In another example, RCAF 104 can determine that an eNodeB is congested, so that some or all connected users are experiencing congestion, when an amount of network traffic passing through the node is greater than a specified tolerable amount of network traffic. In another example, RCAF 104 can determine that an eNodeB is congested, so that some or all connected users are experiencing congestion, when one or more user data rates for users connected to the eNodeB and communicating data through the eNodeB drop below a threshold user data rate.

PCRF 102 can instruct RCAF 104 to limit its congestion reporting to a congestion level. For example, PCRF 102 can instruct RCAF 104 to send congestion reports only when a detected congestion level crosses a threshold level, e.g., level #4, which is severe enough to warrant reporting. PCRF 102 can send such an instruction by sending an MUR command or an NRA command, which are defined respectively in TS 29.2174 sections 4.4.2 (MUR) and 4.4.1.2 (NRA). For example, PCRF 102 can send a MUR command and set:
   1. Reporting-Restriction AVP to a value of 1;
   2. Congestion-Level-Definition AVP to the desired threshold (minimal level or a range of levels); and
   3. RUC-Action to a value of 1.

Network 100 includes a RAN operations, administration, and maintenance (RAN OAM) computer system 106. RAN OAM system 106 is configured for performing various functions in operating, administering, and managing and maintaining a RAN and its associated computer systems. Network 100 includes a serving GPRS support node (SGSN) 108 and a mobility management entity (MME) 110 that communicate with RCAF 104 over Nq' and Nq interfaces, respectively.

MME 110 can be responsible for idle mode UE paging and tagging procedure including retransmissions. MME 110 can be involved in the bearer activation/deactivation process and can be responsible for choosing a serving gateway (SGW) for a UE at the initial attach and at time of intra-network handover involving core network (CN) node relocation.

MME 110 can be responsible for authenticating subscribers. The non access stratum (NAS) signaling terminates at MME 110, and MME 110 can be responsible for generation and allocation of temporary identities to UEs. MME 110 can check the authorization of the UE to camp on the service provider's public land mobile network (PLMN) and enforces UE roaming restrictions. MME 110 can be the termination point in the network for ciphering/integrity protection for NAS signaling and can handle the security key management.

SGSN 108 is responsible for the delivery of data packets to and from the mobile stations within its geographic service area. SGSN 108 performs tasks including packet routing and transfer, mobility management (attach/detach and location management), logical link management, and authentication and charging functions. The location register of the SGSN 108 can store location information (e.g., current cell, current VLR) and user profiles (e.g., IMSI, addresses) of GPRS users registered with SGSN 108.

RCAF 104 can be used in implementing methods, systems, and computer readable media for charging based on radio congestion in mobile networks. For example, RCAF 104 can be used in implementing an offline charging enhancement for radio congestion in mobile networks as described below with reference to FIGS. 2-4. In another example, RCAF 104 can be used in implementing an online charging enhancement for radio congestion in mobile networks as described below with reference to FIGS. 5-7.

Figure 2:
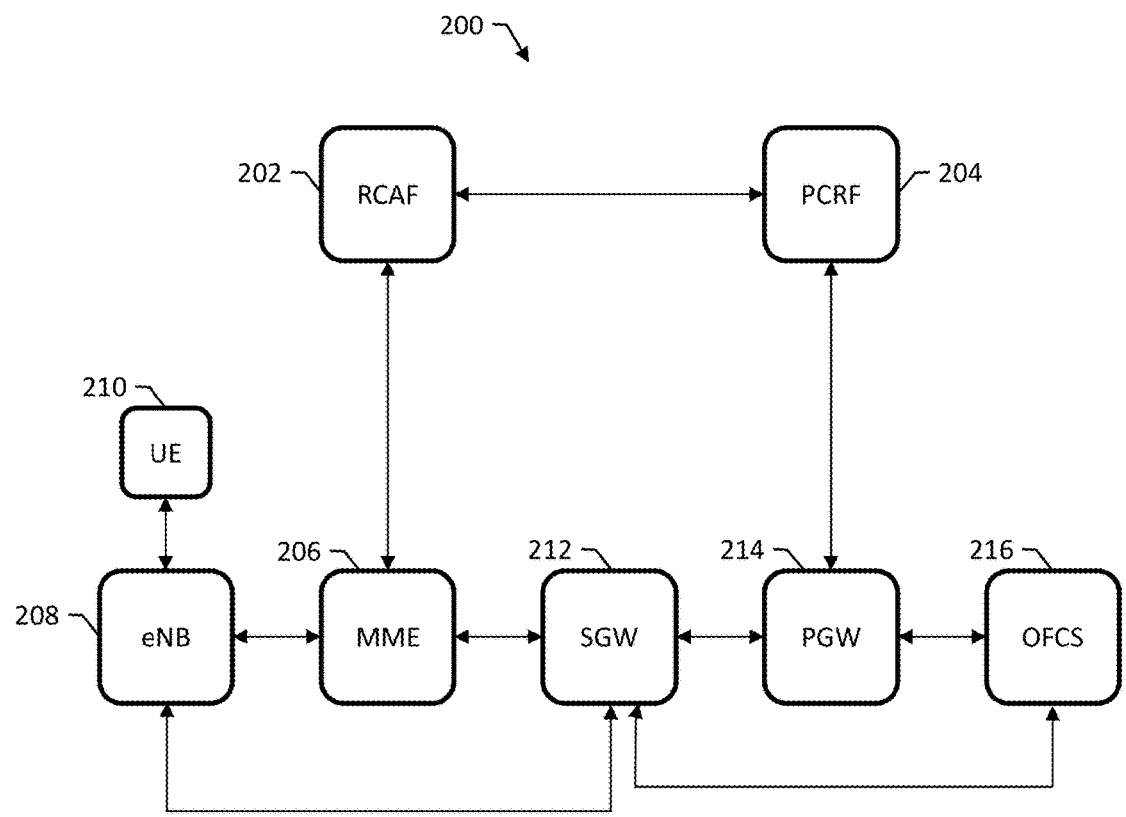
FIG. 2 is a block diagram of a portion of a core network for implementing an offline charging enhancement for radio congestion in mobile networks.

FIG. 2 is a block diagram of a portion of a core network 200 for implementing an offline charging enhancement for radio congestion in mobile networks. Network 200 includes an RCAF 202, a PCRF 204, and an MME 206, which are generally configured to operate as described above with reference to FIG. 1.

Network 200 includes one or more eNodeBs 208 serving one or more UEs 210. MME 206 can communicate with eNodeBs 208 on, e.g., an S1-AP interface.

Network 200 includes a serving gateway (SGW) 212, a PDN gateway (PGW) 214, and an offline charging system (OFCS) 216. SGW 212 routes and forwards user data packets, while also acting as the mobility anchor for the user plane during inter-eNodeB handovers and as the anchor for mobility between LTE and other 3GPP technologies. For idle state UEs, SGW 212 terminates the downlink data path and triggers paging when downlink data arrives for the UE.

PGW 214 can provide connectivity from UEs 210 to external packet data networks by being the point of exit and entry of traffic for or/and from the user equipment. In some cases, a UE may have simultaneous connectivity with more than one PGW for accessing multiple PDNs. PGW 214 can perform policy enforcement, packet filtering, charging support, packet screening, and the like.

OFCS 216 is a charging system configured for collecting information for network resource usage concurrently with that resource usage. OFCS 216 can be implemented as a chain of logical charging functions (e.g., charging trigger function, charging data function, and charging gateway function) that, in operation, produce call detail record (CDR) files.

The CDR files can then be transferred to the network operator's billing domain, e.g., for subscriber billing or inter-operator accounting or both. Generally, OFCS 216 is configured so that the charging information does not affect, in real-time, the services provided by the network operator to the subscribers.

SGW 212 can communicate with MME 206 on, e.g., an S11 interface. SGW 212 can communicate with eNodeBs 208 on, e.g., an S1-U interface. PGW 214 communicates with PCRF 204 over, e.g., a Gx interface. PGW 214 communicates with SGW 212 over, e.g., an S5/8 interface. OFCS 216 communications with PGW 214 over, e.g., a Gz interface.

Figure 3:
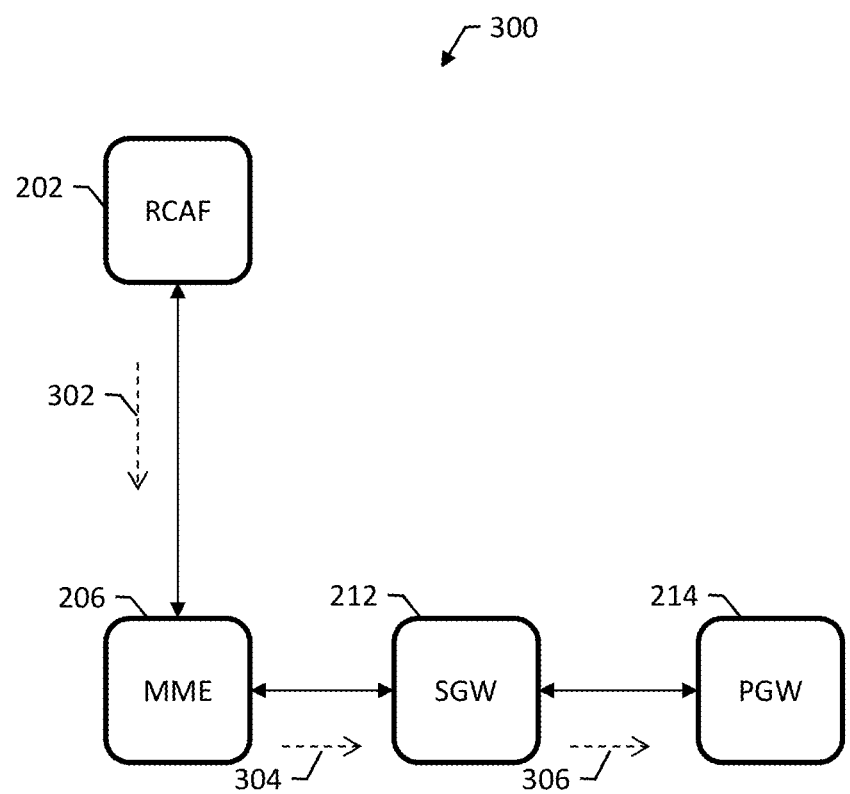
FIG. 3 is a block diagram illustrating a message flow for charging based on radio congestion.

FIG. 3 is a block diagram of a portion of the network 200 of FIG. 2 illustrating a message flow for charging based on radio congestion in mobile networks. Network operators can account for RAN congestion for offline charging of subscribers during billing cycles by altering one or more charging records for the subscribers, e.g., by providing free credits, service packs, refunds, and so on based operator business strategy.

The network 200 can introduce congestion information within the call detail records (CDRs) for subscribers affected by radio congestion. RCAF 202, MME 206, SGW 212, and PGW 214 are configured to carry out the charging based on radio congestion. In some examples, OFCS 216 is specially configured for processing congestion information.

RCAF 202 sends congestion information sends at least one message 302 to MME 206 using an Nq interface. Message 302 specifies, e.g., a congestion level and start and end congestion time stamps (if applicable) along with existing eNodeB/cell identification information. Congestion level and state values can be implemented, e.g., as in the 3GPP defined Np interface between RCAF 202 and PCRF 204.

MME 206 processes message 302 and forwards the congestion related information towards SGW 212 using at least one message 304 an S11 (GTP) interface. In some examples, MME 206 sends the congestion related information for UEs in the ECM_CONNECTED state only. For example, the GTP interface can be configured to convey the information using:

One or more existing information element(s) (IEs) or one or more new IEs

One or more existing messages or one or more new messages

A combination of both of these above options

In some examples, the network 200 is configured so that the operator can choose a scope of applicability for the congestion related information. For example, the network 200 can be configured for charging based on radio congestion on a subscriber-by-subscriber basis or on a node-by-node (eNodeB/cell) basis. In some examples, the congestion related information may be relevant for a group of subscribers within an eNodeB/cell; there, the network 200 can be configured for a common message exchange for all of the subscribers within the group.

In response to receiving message 304 from MME 206, SGW 212 forwards the congestion related information as at least one message 306 to PGW 214. Additionally, SGW 212 alters one or more charging records for at least one subscriber affected by the congestion specified in the congestion related information. For example, SGW 212 can include a congestion level as specified in message 304 in the CDR for a subscriber, e.g., when message 304 includes a subscriber identifier for the subscriber or SGW 212 otherwise determines that the subscriber identifier matches the congestion level specified in message 304. In some examples, SGW 212 is configured to use the congestion related information to trigger generation of interim CDRs.

In response to receiving message 306 from SGW 212, PGW 214 determines that the specified eNodeBs/cells are congested and that some subscribers may be unable to send and/or receive data as per provisioned quality of service (QoS). PGW 212 can be configured to alter charging records based on the congestion related information. For example, PGW 212 can include congestion level, congestion state, and time stamps for start time and end time of congestion into CDRs for subscribers specified by message 306 as being affected by RAN congestion. In some examples, PGW 212 is configured to use the congestion related information to trigger generation of interim CDRs.

Since SGW 212 and PGW 214 can produce CDRs specifying congestion levels and duration of congestion, those CDRs may assist in providing subscribers with an enhanced billing experience (e.g., reduced bills) or offering subscribers additional free packs or otherwise altering charging records based on a network operator's specified preferences. The congestion related information may also be used by operators in detecting areas where additional radio coverage could enhance the subscriber experience, e.g., by improving availability and data rates. Additionally, availability of congestion related information in CDRs can be used by some operators as data points for analyzing network quality, performance, and planning.

Figure 4:
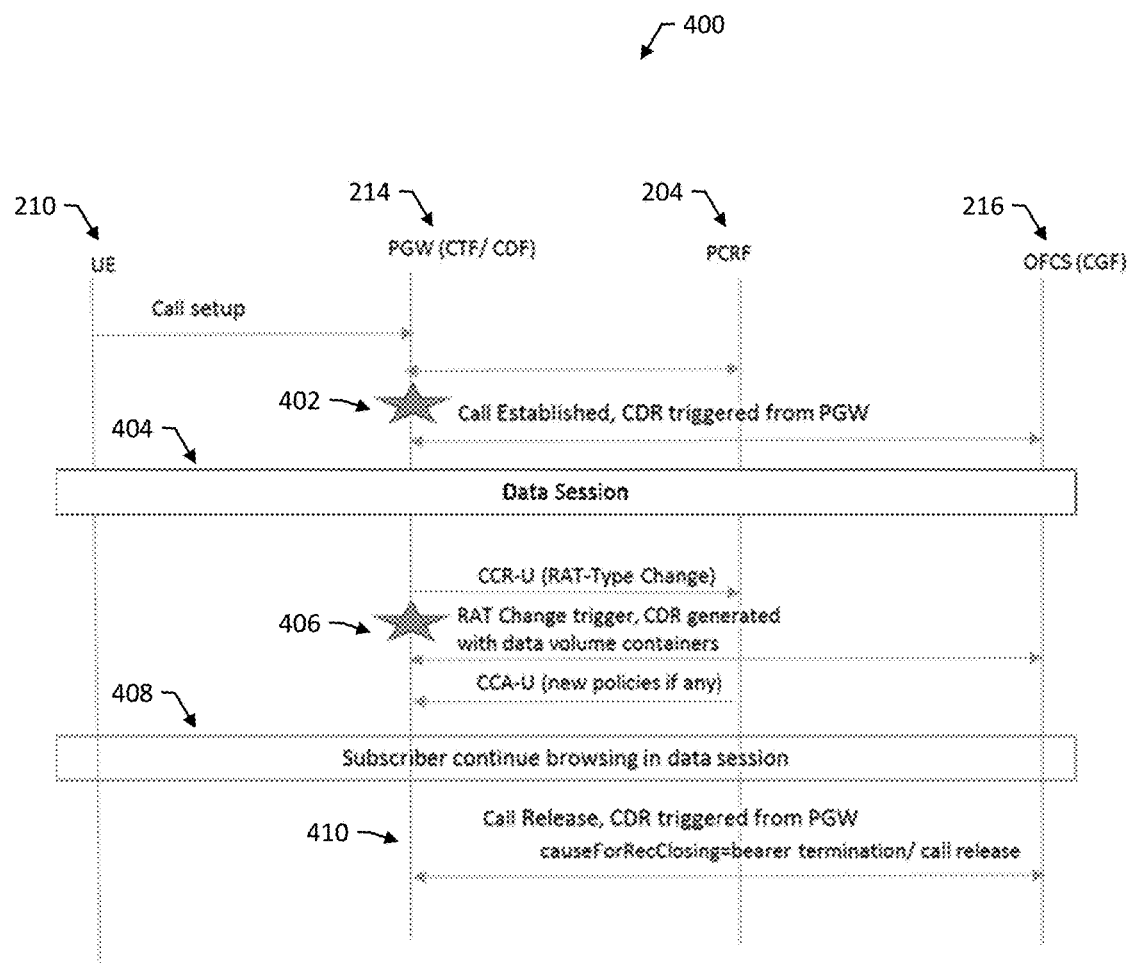
FIG. 4 is a messaging diagram of an example messaging sequence for charging based on radio congestion.

FIG. 4 is a messaging diagram of an example messaging sequence 400 for charging based on radio congestion in the network 200 of FIG. 2. After UE 210 establishes a call with PGW 214 and PCRF 204, PGW 214 triggers production of a first CDR for the call at a first time 402 and provides the CDR to OFCS 216. UE 210 has a data session at a second time 404, and then at a third time 406 PGW 214 triggers production of a second CDR in response to receiving congestion related information. PGW 214 includes congestion related information, e.g., a congestion level and duration information, in the second CDR.

PGW 214 provides the second CDR to OFCS 216. At a fourth time 408, the subscriber continues the data session. At a fifth time 410, the subscriber releases the call, triggering production of a third CDR at PGW 214. PGW 214 provides the third CDR to OFCS 216.

For purposes of illustration, below are the abstract syntax notation one (ASN.1) recommendations for SGW/PGW CDRs to OFCS where the CDR record is generated for subscriber, as defined in 3GPP TS 32.298, in section 5.2 about CDR abstract syntax specifications. The possible CDR abstract syntax specifications can be used in implementing congestion related information for ASN.1 encoding in CDRs.

| ranCongestionInfo | [34] RanCongestionInfo OPTIONAL, |
| RanCongestionInfo | ::= SEQUENCE |
| { | |
| congestionLevel | [0] CongestionLevel, |
| startTime | [1] TimeStamp OPTIONAL, |
| endTime | [2] TimeStamp OPTIONAL, |
| RAN Identifier | [3] eNodeB or CellID |
| } | |
| Definitions of the above mentioned parameters | |
| • CongestionLevel | ::= INTEGER |
| • TimeStamp | ::= OCTET STRING (SIZE) |

SGW 212 and PGW 214 can introduce congestion change as a trigger for generation of interim CDR, so the message fields indicating this change can be introduced within the CDR structure (e.g. list of traffic volume/list of service volume).

PGW 214, having congestion related information for a given subscriber, can then forward the congestion related information in CDRs to OFCS 216. OFCS 216 is typically configured to collate the congestion related information as received for a configurable duration, e.g., to meet specifications for billing or network performance analysis per operator (e.g., to account subscriber charging for congestion while generating monthly bills.)

Figure 5:
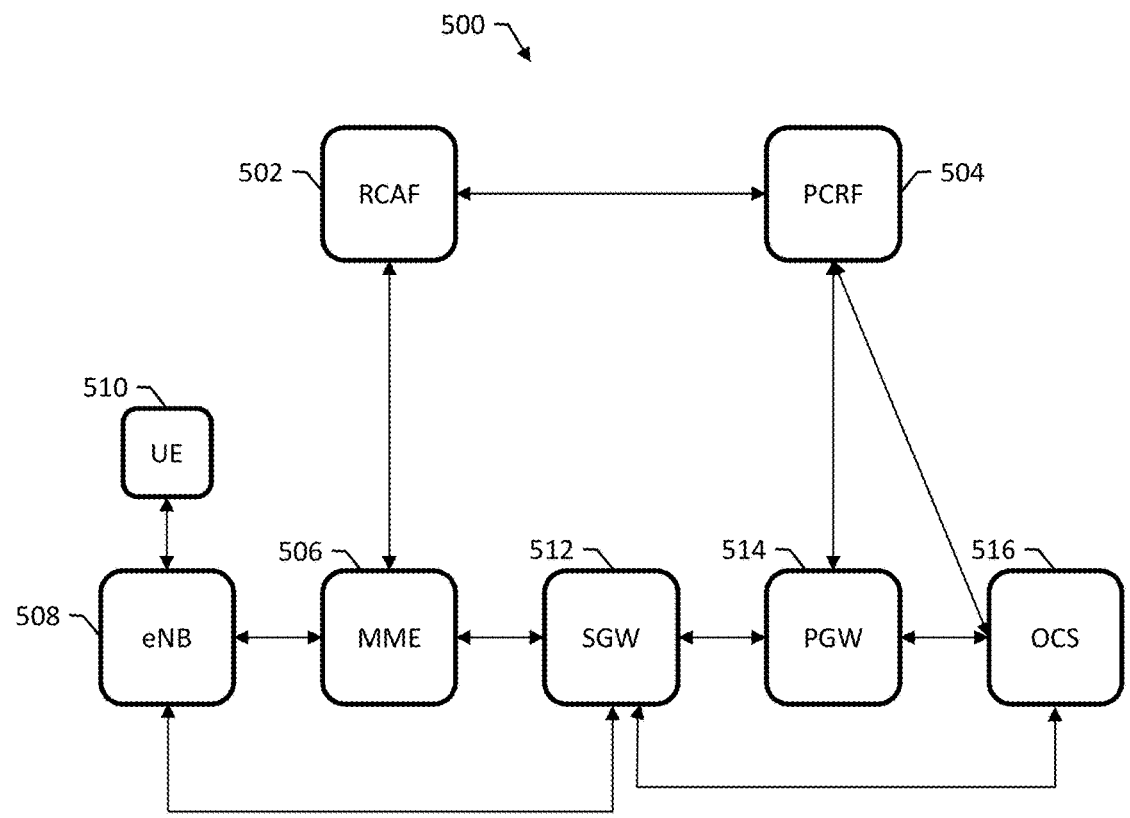
FIG. 5 is a block diagram of a portion of a core network for implementing an online charging enhancement for radio congestion in mobile networks.

FIG. 5 is a block diagram of a portion of a core network 500 for implementing an online charging enhancement for radio congestion in mobile networks. Network 500 includes an RCAF 502, a PCRF 504, and an MME 506, which are generally configured to operate as described above with reference to FIG. 1.

Network 500 includes one or more eNodeBs 508 serving one or more UEs 510. MME 506 can communicate with eNodeBs 508 on, e.g., an S1-AP interface. Network 500 includes a serving gateway (SGW) 512, a PDN gateway (PGW) 514, and an online charging system (OCS) 516. PCRF 504 communicates with OCS 516 using an Sy interface.

OCS 516 can be a credit management system for pre-paid charging. OCS 516 can be implemented as a chain of logical charging functions (e.g., charging trigger function and charging data function). In operation, OCS 516 can check subscriber account balances and supervise service delivery, e.g., to limit network service delivery based on granted network data units based on account balances.

Figure 6:
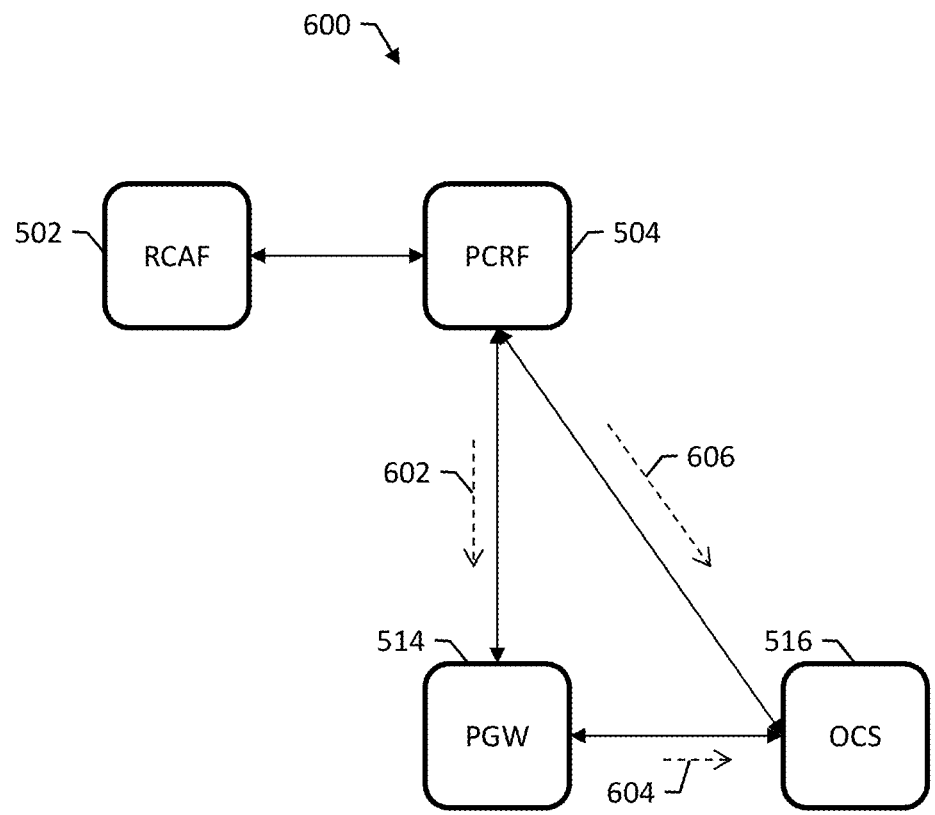
FIG. 6 is a block diagram illustrating a message flow for charging based on radio congestion in mobile networks.

FIG. 6 is a block diagram of a portion of the network 500 of FIG. 5 illustrating a message flow for charging based on radio congestion in mobile networks. Network operators can account for RAN congestion for online charging of subscribers by altering one or more charging records for the subscribers, e.g., by increasing account balances or reducing a rate at which account balances are decreased.

PCRF 504 can exchange RAN congestion information with OCS 516 in any appropriate manner. In some examples, PCRF 504 sends at least one message 602 to PGW 514 over a Gx interface, resulting in PGW 514 sending at least one message 604 to OCS 516 over a Gy interface. In some examples, PCRF 504 sends at least one message 606 to OCS 516 using an Sy interface.

Messages 602, 604, and 606 can specify a congestion level and a duration of congestion, e.g., using time stamps. PCRF 504 can send interface-based messages or session-based messages for affected subscribers. PCRF 504, PGW 514, and OCS 516 can be configured to process interface-based messages or session-based messages depending on the signaling volume, i.e., whether a relatively large number of subscribers are affected or a relatively small number of subscribers are affected.

In some examples, the network 500 is configured so that the operator can choose a scope of applicability for the congestion related information. For example, the network 500 can be configured for charging based on radio congestion on a subscriber-by-subscriber basis or on a node-by-node (eNodeB/cell) basis. In some examples, the congestion related information may be relevant for a group of subscribers within an eNodeB/cell; there, the network 500 can be configured for a common message exchange for all of the subscribers within the group.

In response to receiving message 602 from PCRF 504, PGW 514 determines that the specified eNodeBs/cells are congested and that some subscribers may be unable to send and/or receive data as per provisioned quality of service (QoS). PGW 514 can be configured to alter charging records based on the congestion related information. For example, PGW 514 can include congestion level, congestion state, and time stamps for start time and end time of congestion as part of a subscriber's Gy session with OCS 516. In some examples, PGW 514 includes congestion related information for UEs in the ECM_CONNECTED state only.

OCS 516 receives congestion related information and accounts for, e.g., the congestion level and the duration of congestion. OCS 516 can cause the network 500 to offer instant benefits during the call or post benefits such as additional free packs or other operator specified alterations to charging records.

Figure 7:
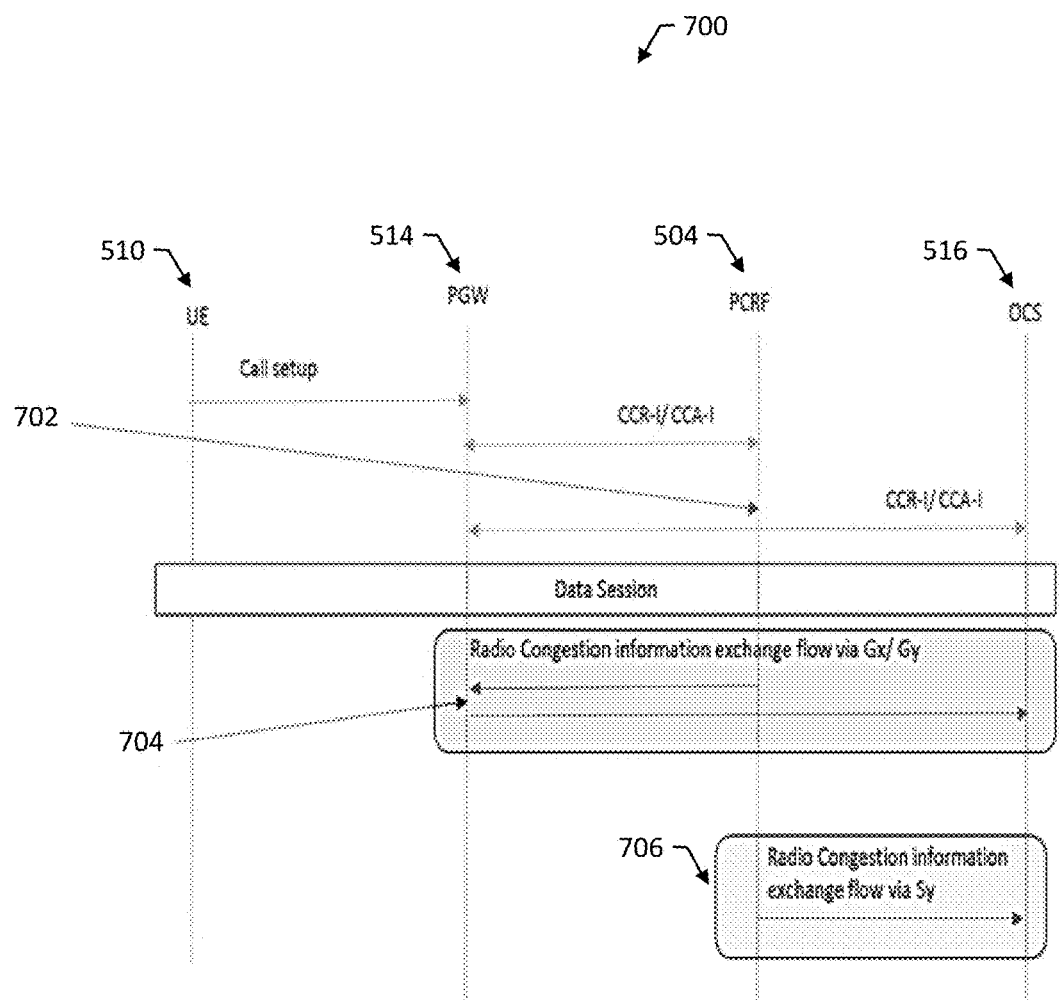
FIG. 7 is a messaging diagram of an example messaging sequence for charging based on radio congestion.

FIG. 7 is a messaging diagram of an example messaging sequence 700 for charging based on radio congestion in the network 500 of FIG. 5. After UE 510 establishes a call with PGW 514 and PCRF 504, PCRF 504 receives congestion related information and subscriber information (e.g., IMSIs of affected subscribers) from RCAF 502 at a first time 702. During a data session, a subscriber is depleting an account balance. At a second time 704, PGW 514 validates the subscriber and alters a charging record, e.g., with OCS 516, by offering the subscriber and alternative at UE 510. At a third time 706, PCRF 504 provides congestion related information to OCS 516 using an Sy interface.

Figure 8:
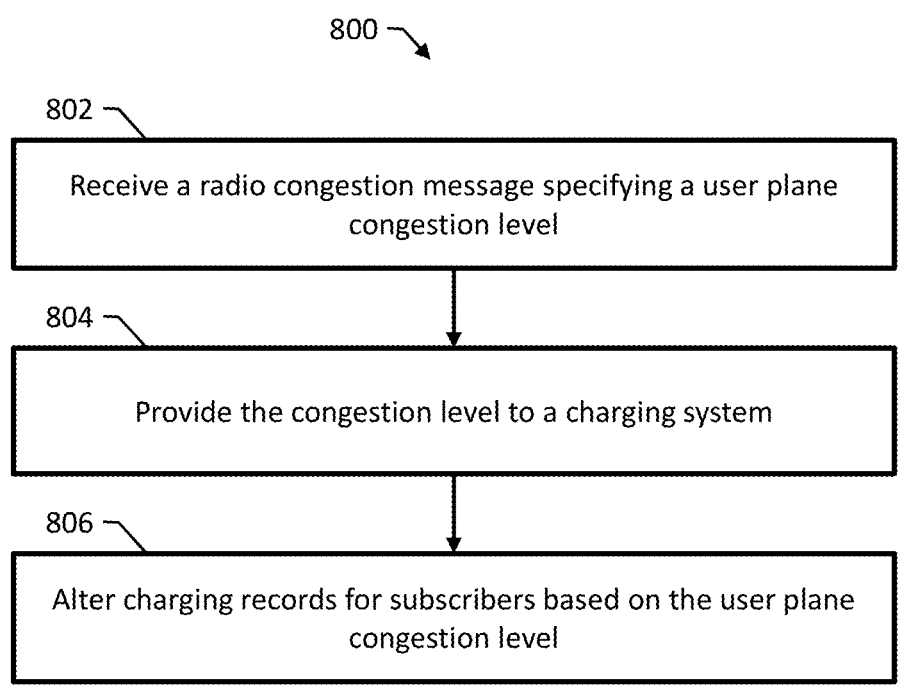
FIG. 8 is a flow diagram of an example method 800 for determining congestion status.

FIG. 8 is a flow diagram of an example method 800 for determining congestion status. The method 800 can be performed by one or more computer systems implementing a core network of a telecommunications network, e.g., one or more of MME 206, SGW 212, and PGW 214 as illustrated in FIG. 3, or one or more of PCRF 504, PGW 514, and OCS 516 of FIG. 6.

Method 800 includes receiving, by one or more computer systems implementing a core network of a telecommunications network, a radio congestion message specifying a user plane congestion level for a radio access network (RAN) from a RAN congestion awareness function (RCAF) for the RAN (802). Method 800 includes providing, by the one or more computer systems, the user plane congestion level to a charging system of the telecommunications network (804). The user plane congestion level can be, e.g., a number in a range that corresponds to varying levels of congestion, or a state indicator that the RAN is congested or is not congested. Method 800 includes altering, by the charging system, one or more charging records for one or more respective subscribers accessing the RAN with user equipment (UE) based on the user plane congestion level (806).

In some examples, the one or more computer systems include a policy and charging rules function (PCRF) system for the telecommunications network, and the charging system is an online charging system (OCS). Providing (804) the user plane congestion level to the charging system can include transmitting, on a Gx interface, the user plane congestion level to a PDN gateway (PGW) that, in response, transmits, on a Gy interface, the user plane congestion level to the OCS. Providing (804) the user plane congestion level to the charging system can include transmitting, on an Sy interface, the user plane congestion level to the OCS. Providing (804) the user plane congestion level to the charging system can include sending one or more interface-based messages or one or more session-based messages.

In some examples, altering (806) the one or more charging records includes, for at least a first subscriber of the one or more subscribers, offering the first subscriber, using first user equipment (UE) of the first subscriber, a choice between at least an instant charging benefit during a session for the first subscriber and a later charging benefit to be implemented after the session.

In some examples, the one or more computer systems include a mobility management entity (MME) system, and the charging system is an offline charging system (OFCS). Providing (804) the user plane congestion level to the charging system can include transmitting, on a S11 interface, the user plane congestion level to a signaling gateway (SGW) and, at the SGW, adding the user plane congestion level to one or more call detail records (CDRs) for the subscribers. Providing (804) the user plane congestion level to the charging system can include transmitting, on a S5/S8 interface, the user plane congestion level to a PDN gateway (PGW) and, at the PGW, adding the user plane congestion level to one or more call detail records (CDRs) for the subscribers.

In some examples, providing (804) the user plane congestion level to the charging system includes providing a duration of congestion for the user plane congestion level to the charging system, and altering (806) the one or more charging records includes altering the one or more charging records based on the duration of congestion.

Accordingly, while the methods, systems, and computer readable media have been described herein in reference to specific embodiments, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein.

Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

It is understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for altering charging based on radio congestion in mobile networks, the method comprising:
  receiving, by one or more computer systems implementing a core network function of a telecommunications network, a radio congestion message specifying a user plane congestion level for a radio access network (RAN) from a RAN congestion awareness function (RCAF) for the RAN, wherein the one or more computer systems comprise a policy and charging rules function (PCRF) system for the telecommunications network;
  providing, by the one or more computer systems, the user plane congestion level to a charging system of the telecommunications network, wherein the charging system is an online charging system (OCS); and
  altering, by the charging system, one or more charging records for one or more respective subscribers accessing the RAN with user equipment (UE) based on the user plane congestion level, wherein altering the one or more charging records comprises, for at least a first subscriber of the one or more subscribers, offering the first subscriber, using first user equipment (UE) of the first subscriber, a choice between at least an instant charging benefit during a session for the first subscriber and a later charging benefit to be implemented after the session.

2. The method of claim 1, wherein providing the user plane congestion level to the charging system comprises transmitting, on a 3$^{rd}$ Generation Partnership Project (3GPP) Gx interface, the user plane congestion level to a packet data network (PDN) PDN gateway (PGW) that, in response, transmits, on a 3$^{rd}$ Generation Partnership Project (3GPP) Gy interface, the user plane congestion level to the OCS.

3. The method of claim 1, wherein providing the user plane congestion level to the charging system comprises transmitting, on a 3$^{rd}$ Generation Partnership Project (3GPP) Sy interface, the user plane congestion level to the OCS.

4. The method of claim 1, wherein providing the user plane congestion level to the charging system comprises sending one or more interface-based messages or one or more session-based messages.

5. The method of claim 1, wherein the one or more computer systems comprises a mobility management entity (MME) system.

6. The method of claim 5, wherein providing the user plane congestion level to the charging system comprises transmitting, on a 3$^{rd}$ Generation Partnership Project (3GPP) S11 interface, the user plane congestion level to a signaling gateway (SGW) and, at the SGW, adding the user plane congestion level to one or more call detail records (CDRs) for the subscribers.

7. The method of claim 5, wherein providing the user plane congestion level to the charging system comprises transmitting, on a 3$^{rd}$ Generation Partnership Project (3GPP) S5/S8 interface, the user plane congestion level to a PDN gateway (PGW) and, at the PGW, adding the user plane congestion level to one or more call detail records (CDRs) for the subscribers.

8. The method of claim 1, wherein providing the user plane congestion level to the charging system comprises providing a duration of congestion for the user plane congestion level to the charging system, and wherein altering the one or more charging records comprises altering the one or more charging records based on the duration of congestion.

9. A system for altering charging based on radio congestion in mobile networks, the system comprising:
one or more computer systems implementing a core network function of a telecommunications network, wherein the one or more computer systems comprise a policy and charging rules function (PCRF) system for the telecommunications network; and
a charging system for the telecommunications network, wherein the charging system is an online charging system (OCS);
wherein the one or more computer systems are configured for receiving a radio congestion message specifying a user plane congestion level for a radio access network (RAN) from a RAN congestion awareness function (RCAF) for the RAN and providing the user plane congestion level to the charging system; and
wherein the charging system is configured for altering one or more charging records for one or more respective subscribers accessing the RAN with user equipment (UE) based on the user plane congestion level, wherein altering the one or more charging records comprises, for at least a first subscriber of the one or more subscribers, offering the first subscriber, using first user equipment (UE) of the first subscriber, a choice between at least an instant charging benefit during a session for the first subscriber and a later charging benefit to be implemented after the session.

10. The system of claim 9, wherein providing the user plane congestion level to the charging system comprises transmitting, on a 3$^{rd}$ Generation Partnership Project (3GPP) Gx interface, the user plane congestion level to a packet data network (PDN) PDN gateway (PGW) that, in response, transmits, on a 3$^{rd}$ Generation Partnership Project (3GPP) Gy interface, the user plane congestion level to the OCS.

11. The system of claim 9, wherein providing the user plane congestion level to the charging system comprises transmitting, on a 3$^{rd}$ Generation Partnership Project (3GPP) Sy interface, the user plane congestion level to the OCS.

12. The system of claim 9, wherein providing the user plane congestion level to the charging system comprises sending one or more interface-based messages or one or more session-based messages.

13. The system of claim 9, wherein the one or more computer systems comprises a mobility management entity (MME) system.

14. The system of claim 13, wherein providing the user plane congestion level to the charging system comprises transmitting, on a 3$^{rd}$ Generation Partnership Project (3GPP) S11 interface, the user plane congestion level to a signaling gateway (SGW) and, at the SGW, adding the user plane congestion level to one or more call detail records (CDRs) for the subscribers.

15. The system of claim 13, wherein providing the user plane congestion level to the charging system comprises transmitting, on a 3$^{rd}$ Generation Partnership Project (3GPP) S5/S8 interface, the user plane congestion level to a PDN gateway (PGW) and, at the PGW, adding the user plane congestion level to one or more call detail records (CDRs) for the subscribers.

16. The system of claim 9, wherein providing the user plane congestion level to the charging system comprises providing a duration of congestion for the user plane congestion level to the charging system, and wherein altering the one or more charging records comprises altering the one or more charging records based on the duration of congestion.

17. A non-transitory computer readable medium having stored thereon executable instructions that when executed by one or more processors control the one or more processors to perform operations comprising:
receiving, by one or more computer systems implementing a core network function of a telecommunications network, a radio congestion message specifying a user plane congestion level for a radio access network (RAN) from a RAN congestion awareness function (RCAF) for the RAN, wherein the one or more computer systems comprise a policy and charging rules function (PCRF) system for the telecommunications network;
providing, by the one or more computer systems, the user plane congestion level to a charging system of the telecommunications network, wherein the charging system is an online charging system (OCS); and
altering, by the charging system, one or more charging records for one or more respective subscribers accessing the RAN with user equipment (UE) based on the user plane congestion level, wherein altering the one or more charging records comprises, for at least a first subscriber of the one or more subscribers, offering the first subscriber, using first user equipment (UE) of the first subscriber, a choice between at least an instant charging benefit during a session for the first subscriber and a later charging benefit to be implemented after the session.

* * * * *

UNITED STATES PATENT AND TRADEMARK OFFICE
CERTIFICATE OF CORRECTION

PATENT NO. : 10,237,418 B2  
APPLICATION NO. : 15/494317  
DATED : March 19, 2019  
INVENTOR(S) : Aravamudhan et al.

Page 1 of 1

It is certified that error appears in the above-identified patent and that said Letters Patent is hereby corrected as shown below:

In the Claims

In Column 13, Line 10, in Claim 2, delete "(PDN)" and insert -- (PDN), --, therefor.

In Column 14, Line 9, in Claim 10, delete "(PDN)" and insert -- (PDN), --, therefor.

Signed and Sealed this  
Third Day of March, 2020

Andrei Iancu  
*Director of the United States Patent and Trademark Office*